May 15, 1934.  R. V. GRAYSON  1,958,819
APPARATUS FOR MANUFACTURING INSULATION BOARD
Filed Sept. 19, 1932   4 Sheets-Sheet 1
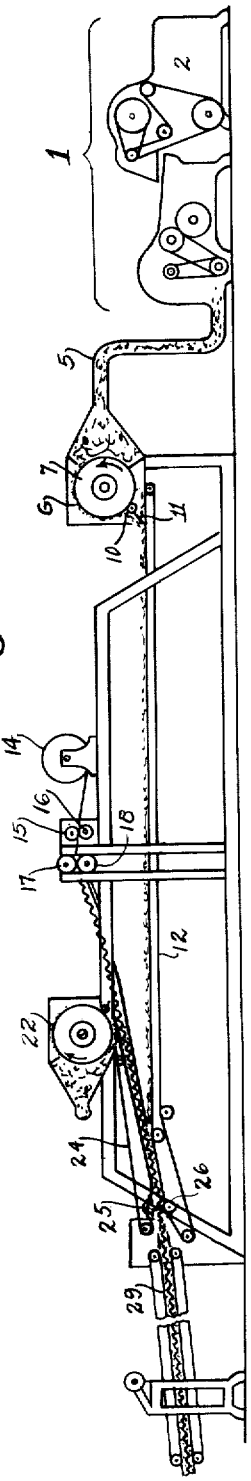
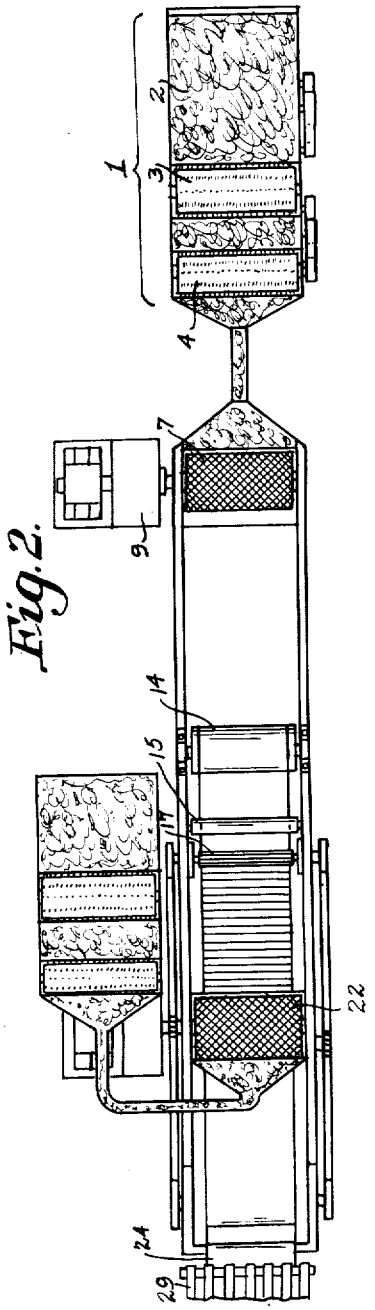
Inventor
RALPH V. GRAYSON
By Mason Fenwick & Lawrence
Attorneys May 15, 1934.  R. V. GRAYSON  1,958,819
APPARATUS FOR MANUFACTURING INSULATION BOARD
Filed Sept. 19, 1932  4 Sheets-Sheet 2
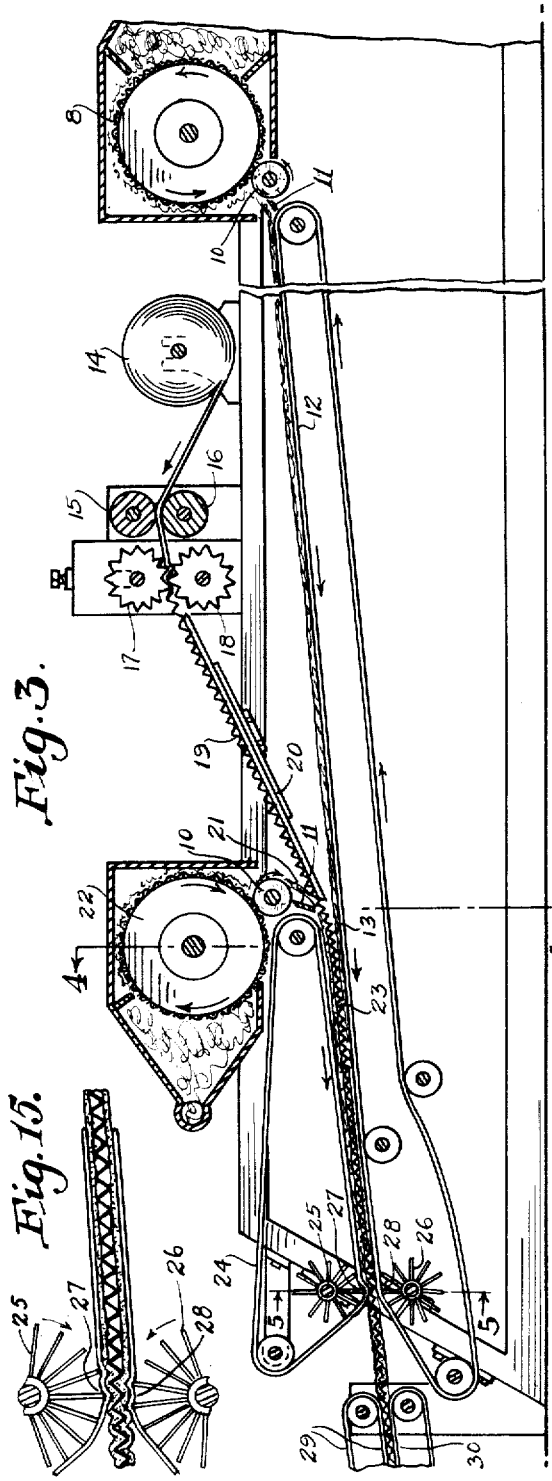
Inventor
RALPH V. GRAYSON May 15, 1934. R. V. GRAYSON 1,958,819
APPARATUS FOR MANUFACTURING INSULATION BOARD
Filed Sept. 19, 1932 4 Sheets-Sheet 3
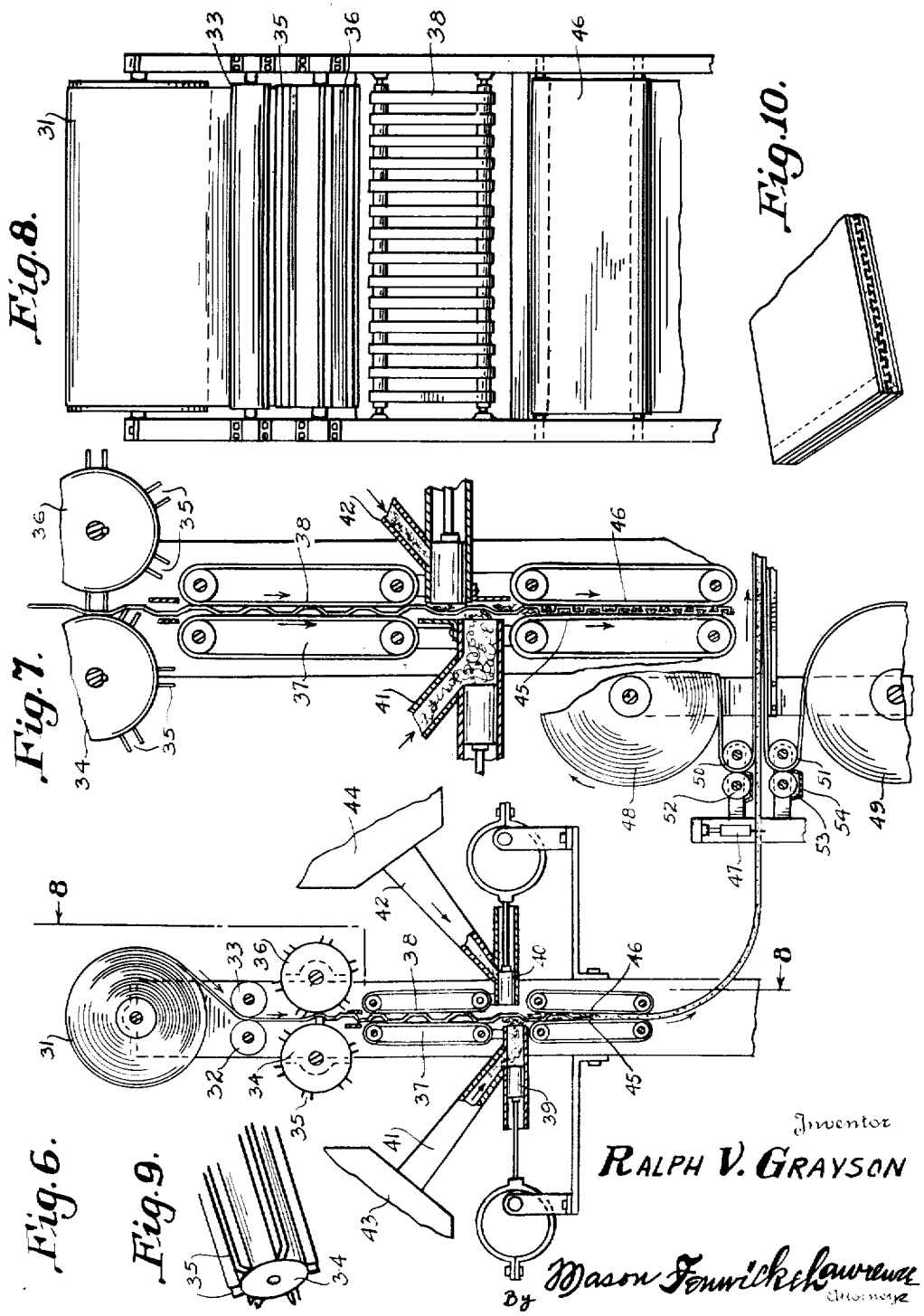
Inventor
RALPH V. GRAYSON
By Mason Fenwick Lawrence
Attorneys May 15, 1934.    R. V. GRAYSON    1,958,819
APPARATUS FOR MANUFACTURING INSULATION BOARD
Filed Sept. 19, 1932    4 Sheets-Sheet 4

Inventor
RALPH V. GRAYSON
By Mason Fenwick & Lawrence
Attorneys

Patented May 15, 1934

1,958,819

UNITED STATES PATENT OFFICE 1,958,819

APPARATUS FOR MANUFACTURING INSULATION BOARD

Ralph V. Grayson, Atlanta, Ga.

Application September 19, 1932, Serial No. 633,859

8 Claims. (Cl. 154—27)

This invention relates to apparatus for manufacturing insulation board of that type having a skeletal core or strut-work formed in corrugations or grooves, stuffed with insulation fiber and enclosed, if desired, on one or both sides of the core with walls formed of sheet material having thermal insulation and/or fire-proof qualities.

Certain of the forms of insulation board, the manufacture of which is contemplated by apparatus embodying the principles of the present invention, are disclosed in my co-pending application, Serial No. 624,595, filed July 25, 1932.

One of the objects of the invention is the provision of means for successively conforming the member which constitutes the core or strut-work, stuffing the corrugations and grooves while the latter are in more or less incipient form with the insulation fiber, and imparting the final conformation to the stuffed core member, whereby the insulation fiber is uniformly densified throughout the extent of the board.

Other objects of the invention will appear as the following description of a preferred and practical embodiment of the invention proceeds.

In the drawings which accompany and form a part of the following specification, and throughout the several figures of which the same characters of reference have been employed to designate identical parts:

Figure 1 is a side elevation, somewhat diagrammatic, showing a machine for forming insulation board in which the core member is constructed as an intermediate partition, the grooves of which are formed as alternately reversed dihedral angles, the insulation fiber constituting upper and lower sheets suitably forced into the corrugations.

Figure 2 is a plane view of the machine shown in Figure 1;

Figure 3 is a side elevation on an enlarged scale showing details of construction of the parts shown more diagrammatically in Figure 1;

Figure 4 is a section taken along the line 4—4 of Figure 3;

Figure 5 is a section taken along the line 5—5 of Figure 3;

Figure 6 is a vertical section through another form of apparatus adapted to produce a core member in which the corrugations are of final dove-tail cross section;

Figure 7 is a vertical section on an enlarged scale showing details of construction of the apparatus shown in Figure 6;

Figure 8 is a section taken along the line 8—8 of Figure 6;

Figure 9 is a perspective view of the end portion of one of the rolls for scoring the sheet material employed in making the core member;

Figure 10 is a perspective view of a fragment of the insulation board indicating the preferred direction of the stitching, where stitching is employed;

Figure 15 is an enlarged detail in elevation of the stuffing rollers shown in Figure 3.

Figure 11:
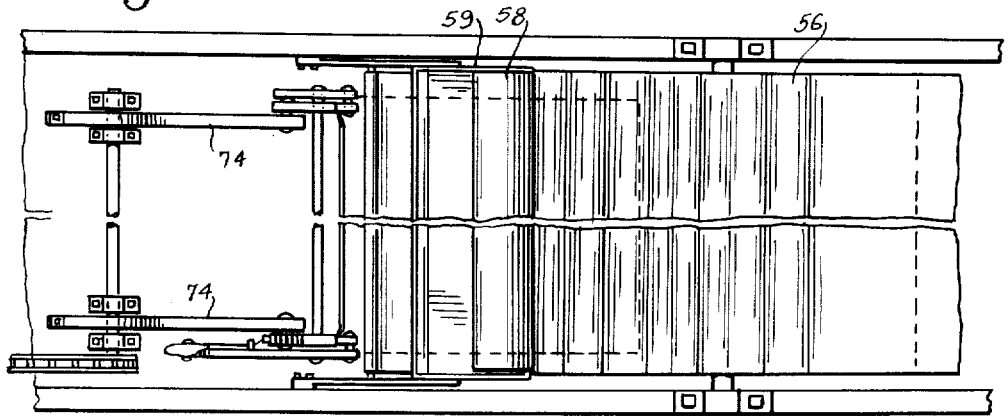
Figure 11 is a plan view of a modified form of machine.

Referring now in detail to the several figures, and first adverting to that form of the invention shown in Figures 1 to 5, inclusive, that part of the machine embraced by the bracket 1 in Figures 1 and 2, is of standard construction and has for its object the working of the insulation fiber which is fed in mass to the hopper 2 and is picked and fluffed by the rollers 3 and 4. A conduit 5 leads to a casing 6 enclosing a hollow roll 7 having a screen mesh 8 on its periphery. The interior of the roll is connected to a blower 9, so that a vacuous condition is maintained within the roll 7. The vacuum is transmitted through the screen mesh 8 to the conduit 5 and draws cotton against the screen mesh 8. As the roll rotates under driving means, not shown, a fleece of cotton collects on the surface of the screen mesh which is diverted away from the surface of the roll by a small roller 10 preferably made of cork and rotating in the same direction as the roll 7. A blade 11 is arranged with its free edge adjacent the cork roller 10, which blade further diverts the cotton, directing it upon an endless belt 12. The endless belt 12 carries the cotton fleece down to the point 13, at which point it comes into operative relation to the corrugated core member on the under-side thereof.

The aforesaid core member may be either a sheet of metal or cardboard. The present embodiment is presumed to be the latter. The sheet stock is carried on a roller 14 from which it is fed by rollers 15 and 16, one of which is driven. The sheet passes between inter-meshing corrugating rollers 17 and 18, the cylindrical surfaces of which are provided with ridges with intervening valleys between, which ridges and valleys, the sheet stock is constricted and suitably formed into corrugations as shown at 19 in Figure 3. The corrugated sheet stock passes down a suitable support 20, being met on its upper side by a fleece 21 of insulation fiber, which fleece has been formed about a roller 22 similar to the roller 7 which has already been described.

The juncture of the upper as well as the lower fleece with the corrugated core member takes place at about the advance end of a convergent channel 23 formed between the upper flight of the conveyor belt 12 and the lower flight of another endless belt 24. The upper end lower fleeces lie as blankets against the perspective upper and lower apices of the corrugations of the core member, being compressed into intimate contact with said core member as the latter, together with said fleeces passes toward the convergent end of the channel 23.

A pair of stuffing rollers 25 and 26 is provided at the convergent end of the channel 23, said rollers having blades 27 and 28, arranged in staggered relation and terminating substantially in the same plane so that as the rollers 25 and 26 rotate, they push the fleeces positively into the channels between the peaks of the corrugations. The core member thus stuffed passes between another pair of converging belts 29 and 30 operating at such a speed that the corrugations are piled together in closer relationship, compressing the stuffing between them, thus imparting a uniform density to the insulation fiber.

While the employment of cotton, preferably fire-proofed, is contemplated in the manufacture of this insulation board, it is to be understood that the invention also includes an inherently fire-proof material, such for example, as mineral wool.

In the interest of simplicity of the description, Figures 1, 2 and 3 have omitted the disclosure of means for applying surface sheets to the opposite sides of the insulation unit thus formed. In the other forms of the invention, presently to be described, such apparatus is clearly disclosed and it will be obvious to one skilled in the art, that the stuffed corrugated core as disclosed in Figures 1, 2 and 3, can be made the intermediate member of a laminated board having upper and lower sheet members adhesively applied to the apices of the corrugations, or secured to the core member by stitching.

Figures 6 to 10, inclusive, illustrates a slightly modified form of the invention in which the stuffing of fibrous insulation material is forced into place in one operation, instead of first being made and subsequently forced, as in that form of the invention previously described.

Figure 6 shows that the core stock 31 is fed from a reel by rollers 32 and 33, past the scoring rollers 34 and 35. The intention in this instance, is to make the core member of flat topped corrugations divergently open up to the time of stuffing and subsequently constricted so that they become of dove-tail cross section. The scoring rollers are provided with blades 35 arranged in spaced pairs, the distance between the blades of a pair determining the width of the bottoms of the corrugations, and the rollers being arranged with the pairs of blades staggered. The sheet stock with the initially formed corrugations passes between parallel conveyors 37 and 38, the linear speed of which is slightly less than the feeding speed of the sheet stock, so that in passing between said conveyors, the travel of the sheet stock is somewhat retarded and the corrugations permitted to pile up, becoming deeper and having straighter sides. When the corrugated sheet stock emerges from the conveyors 37 and 38, it passes in the zone of action of alternately operating stuffing plungers 39 and 40 arranged in cylinders which communicate with chutes 41 and 42 leading to hoppers, 43 and 44, through which the insulation fiber is forced by suitable air pressure or other means. Beyond the zone of action of the plungers 39 and 40, is another pair of endless conveying belts 45 and 46, which slightly converge toward their posterior ends. Just as each corrugation reaches a position in advance of the conveyor belts 45 and 46, it comes into the path of action of one of the plungers 39 or 40 which forces a charge of cotton into the corrugations.

It will be understood that the plungers are not round, but are as long as the width of the sheet stock. As soon as the corrugation has been thus forcibly stuffed, it passes under the influence of the convergent conveyor belts 45 and 46, where the sides of the corrugations are brought together until they converge at their open ends in dove-tail fashion, the insulation fiber having been uniformly compressed. From the convergent conveyor belts 45 and 46, the stuffed and corrugated core may pass into the field of a stitching device 47 where a line of cross stitching through the middle of each corrugation secures the stuffing material in place. It is to be understood that while the stitching device is quite advantageous where the core member is of paper or cardboard, it is superfluous where the core is of screen mesh or other metallic construction.

Figure 6 shows that the stuffed core member may, if desired, be enclosed between surface sheets, thus providing a laminated insulation board as shown in Figure 9. Upper and lower rollers 48 and 49 carry the surface sheet which is fed by suitable means, not shown, over the rollers 50 and 51, and in parallel relation to the finished core member. In advance of the rollers 50 and 51 are moistening devices 52 and 53, dipping in pans 54 containing mucilage, sodium silicate or other suitable adhesive, which is applied to the under-side of the sheet stock being fed from the rollers 48 and 49. In this manner, the sheet stock is caused to adhere to the upper and lower flat faces of the corrugations providing an insulation board of laminated construction similar to the fragment shown in Figure 10.

Another form of stuffing corrugator is shown in Figures 11 to 14, inclusive. In this machine, the rolls 55 and 56 are shaped to give a simple undulating corrugation to the sheet stock, the latter being fed into the rolls in the direction of the arrow shown near the upper part of Fig. 12, from a suitable reel or other supply source, not shown. When the corrugated stock reaches the point indicated at 57 the apices of the corrugations are wiped by an adhesive roller 58 dipping into a pan 59 containing the sodium silicate or other adhesive. The corrugated board with the moist apices then passes down to the region of stuffing indicated by the general character 60 in Figure 12. Here a fleece or layer 61 of the vegetable or mineral insulation fiber is being fed on the upper flight of an endless conveyor 62.

Figure 12:
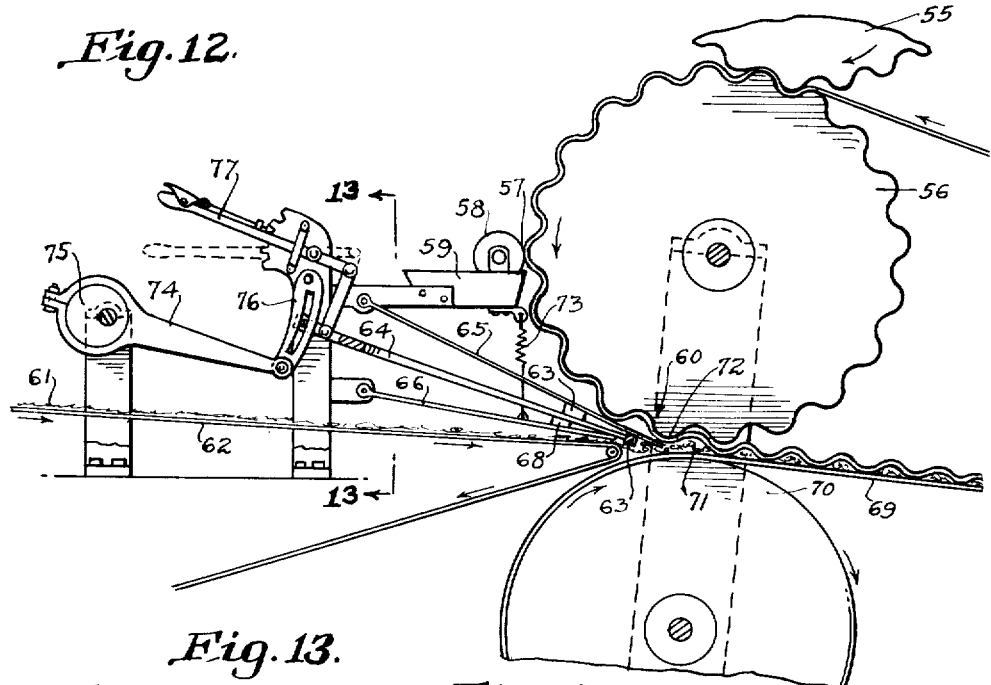
Figure 12 is a side elevation of the same.
Figure 13:
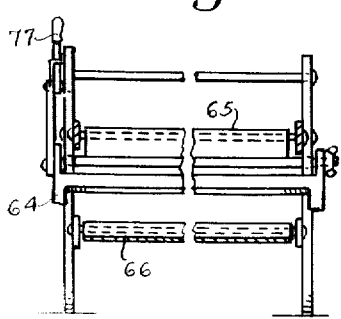
Figure 13 is a section taken along the line 13—13 of Figure 12.
Figure 14:
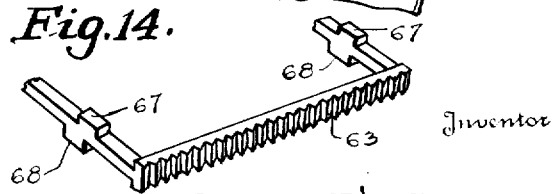
Figure 14 is a perspective view of the stuffing bar.

An elongated plunger bar 63 lies adjacent the anterior end of the endless conveyor belt and as the cotton or mineral fiber reaches the position in advance of the plunger bar, it forces the insulation fiber into the adjacent corrugation. Figure 12 shows that the plunger bar is operated by reciprocatory rods 64 which have the dual function, not only of actuating the plunger bar, but also for deflecting the two hinged plates 65 and 66. Said plates terminate near the plunger bar. The latter on its upper and lower surfaces is provided with cams 67 and 68 which engage the deflector plates 65 and 66. When the plunger is making its forward stroke, the cams 67 and 68 press against the deflector plates 65 and 66, pushing the upper one against the moistened apex of the corrugation adjacent the point of stuffing, protecting the apex from becoming coated with lint which would prevent its adhering to the surface sheet. At the same time, the lower deflector plate is pushed against the sheet of fleece as it is being fed, producing discontinuity in the fleece at the point of stuffing, and causing the fleece to build up into a thick mass behind the deflector plate ready to be introduced into the succeeding corrugation.

The stock constituting the surface sheet 69 is fed from a roll 70 in the direction parallel to the corrugated sheet as the latter leaves the point of stuffing, and so as to make contact with the apices of the corrugations. An open sided chamber 71 is formed in advance of the plunger bar 63, defined on the one hand by the corrugated core member and on the other hand by the surface sheet 69. The insulation fiber is stuffed into the chamber 71, and upon further rotation of the roll 56, the adjacent apex 72 which was protected by the upper deflector plate 65, now, free from lint, comes into contact with the surface sheet and becomes adhesively attached thereto.

Upon the return movement of the plunger bar, the cams 67 and 68 recede, permitting the upper deflector plate 65 to drop slightly so that it will not have a rubbing action against the apices of the corrugated core member which might wipe the adhesive therefrom. In the meantime, the lower deflector member is pulled up through the instrumentality of the spring 73 so that the insulation fiber which has been backed up to the rear of the deflector member now comes in and is deposited forwardly of the plunger, ready to be stuffed into the next corrugation.

The plunger bar is actuated by a connecting rod 74 operated through suitable means such as the eccentric 75, provided with a link 76 by means of which the throw of the reciprocating rods 64 may be adjusted through the manual lever 77 or its equivalent.

In this form of the invention, the corrugations are made initially, of full depth, so that no conforming or constricting step is necessary in the completion of the product.

It will, of course, be understood that in the above described embodiment of apparatus, I have disclosed merely so much structure as may illustrate the practical exercise of the principles of my invention, and that the details of construction and the arrangement of the several parts may be varied as the apparatus becomes perfected without violating the spirit and scope of the invention as claimed in the appended claims.

What I claim is:

1. Apparatus for making insulation board comprising means for working regular channels in sheet stock, means for poking insulation fiber into said channels, and means for constricting said stuffed channels so as uniformly to densify the insulation fiber.

2. Apparatus for making insulation board comprising means for working channels in a continuously fed length of sheet stock, means beyond the channel working means for stuffing insulation fiber into said channels, and means beyond the stuffing means for constricting the channels so as uniformly to densify the insulation fiber.

3. Apparatus for making insulation board comprising means for working channels in a continuously fed length of sheet stock, means beyond the channel working means for stuffing insulation fiber into said channels, means beyond the stuffing means for constricting the channels so as uniformly to densify the insulation fiber, and means for applying a surface sheet or sheets to the said channeled stock, bridging the stuffed channels, for holding them in constricted position.

4. Apparatus for making insulation board comprising crimping rollers at least one of which is positively driven, for working corrugations in a continuously fed length of sheet stock, means beyond the corrugation working means for stuffing insulation fiber into the valleys of said corrugations, and a pair of convergent conveyor belts between which said stuffed corrugated sheet stock wedgingly passes, for constricting said corrugations so as uniformly to densify the insulation fiber.

5. Apparatus for making insulation board as claimed in claim 4, the convergent conveyor belts being driven at a speed slower than the feeding speed of said sheet stock whereby the corrugations are crowded together in the passage of said sheet stock between said belts.

6. Apparatus making insulation board comprising means for continuously feeding a length of sheet stock, means for up-setting the sheet stock to form corrugations, means for feeding insulation fiber to points adjacent the sheet stock in the region of the formation of incipient corrugations, plungers operative synchronously with said feeding means for stuffing the insulation fiber into said corrugations, and convergent belts beyond the stuffing point, between which the stuffed corrugated sheet stock wedgingly travels, for crowding the corrugations, thereby uniformly densifying the insulation fiber, and means for applying surface sheets adhesively to the apices of said corrugations, maintaining them in constricted position.

7. Apparatus for making insulation board as claimed in claim 6, including stitching means for binding said stuffing to said corrugated sheet stock.

8. Apparatus for making insulation board comprising corrugated rolls, means for feeding a length of sheet stock continuously between said rolls for up-setting it into corrugations, means for applying liquid adhesive to the apices of said corrugations, means for conveying insulation fiber to a stuffing, means for feeding a surface sheet continuously into contact with said corrugated sheet stock in the region of said stuffing point forming with each corrugation, a chamber, a reciprocating plunger for stuffing the insulation fiber into said chamber, means operated by said plunger on its forward stroke for intermittently cutting off the supply of insulation fiber to said chamber and means actuated by said plunger for protecting the moist apices of said corrugations from contact of the insulation fiber in advance of the region of stuffing.

RALPH V. GRAYSON.